106. COMPOSITIONS,
COATING OR PLASTIC.
95

827,158

*British pat. #830 of 1898 (106-24)*

UNITED STATES PATENT OFFICE.

PAUL O. KROTTNAURER, OF CHICAGO, ILLINOIS.

COMPOSITION OF MATTER TO BE USED IN MAKING WATERPROOF AND POLISHABLE CEMENTS.

No. 827,158.  Specification of Letters Patent.  Patented July 31, 1906.

Application filed August 14, 1905. Serial No. 274,243.

*To all whom it may concern:*

Be it known that I, PAUL O. KROTTNAURER, a citizen of the United States, residing at Chicago, in the county of Cook and State of Illinois, have invented certain new and useful Improvements in Compositions of Matter to be Used in Making Waterproof and Polishable Cements, of which the following is a specification.

It is an established fact that concrete or artificial stone made of Portland cement and other aggregates lacks density, is more or less porous, absorbing moisture, and takes polish only where the aggregates appear on the surface. The cement itself does not polish.

To avoid the porosity of the concrete or artificial stone and to make the Portland cement impermeable and take polish is the object of my invention.

Having for my object the use of the silica in a gelatinous form mixed with a fatty acid which in the hardened cement mortar rejects water, I must saponify the natural fat which I use for the manufacture of a waterproof material or compound.

If hydracid or oxyacid be added to Portland cement, a reaction takes place accompanied by the production of heat, forming a gelatinous precipitate of silicic acid at once, and at the same time as the calcium oxid is neutralized by the acid a salt of the metallic oxid of calcium and acid is formed by the interchange of the elements of the acid and calcium oxid, hydrogen of the first being replaced by metal of the second, while the rest of the hydrogen and oxygen give rise to another part of the reaction—namely, the formation of water. Instead of saponifying the fat separately from the decomposition of the Portland cement by acid I not only make use of the heat generated by the latter process, but of the heat and water produced in the nascent state, both of sufficiently high temperature to decompose neutral fats into fatty acids (soap) either by water and heat alone or by the surplus of saponifying agents present in this process of treating cement with acid. Concentrated acid cannot alone be used for dissolving Portland cement because of a too sudden reaction taking place, resulting in a caked or grainy product.

In the manufacture of my waterproof compound it is of the utmost importance to avoid a surplus of water, and finding the amount of water produced by the reaction of the acid being sufficient to saponify the fat used instead of diluting the acid I heat and mix fat and cement before putting in the acid. This retards the reaction when cement is treated with concentrated acid, prevents a too high temperature, and the forming of a granulated or lumpy solution. The amount of acid is fixed by the law which governs the neutralization or saturation of acids by bases. For instance, one hundred pounds of Portland cement with 62.5 per cent. CaO will neutralize 109.45 pounds of concentrated sulfuric acid.

To produce my compound I proceed as follows: To one hundred pounds of Portland cement I add six pounds of natural fat, mixing both thoroughly by heating and pugging, then treat this mixture with 109.45 pounds of acid. This results in forming a soapy gelatinous substance which is practically soluble in water. To this is added one hundred pounds of finely-ground dry clay or earthy matter, like chalk or coloring-matter. This forms my compound, which may be added to Portland cement in the proportion of one pound to ten pounds of Portland cement, which when gaged with water will set slowly, yet will harden more promptly than the ordinary commercial Portland-cement mortar, and if mixed with the usual amount of aggregates an artificial stone can be made having greater density and hardness, taking a polish like marble, and be impermeable to moisture. This compound mixed with Portland cement (the latter very finely ground) and water to a consistency of paint and applied with a brush to metal or stone, artificial or natural, hardens well and makes an excellent protection to exposed surfaces.

Portland cement alone is not satisfactory as a paint, as it dries out before hardening and peels off. For cement used in making semidry mortar for artificial stone I dry the putty-like compound and grind it into the cement in the ordinary way.

Having thus described my process, what I claim, and desire to secure by Letters Patent, is—

1. The herein-described composition of matter consisting of Portland cement sixteen parts, natural fat one part, acid eighteen and twenty-four one-hundredth parts, and finely-ground clay or coloring-matter sixteen parts, substantially as specified.

2. The herein-described composition of matter produced by first mixing Portland cement with fat, then treating this mixture with acid and adding thereto finely-ground clay or coloring-matter, substantially as specified.

In testimony whereof I affix my signature in presence of two witnesses.

PAUL O. KROTTNAURER.

Witnesses:
H. C. HUNSBERGER,
W. H. FAIN.